March 26, 1968
A. E. BROUGHTON
3,374,713
RECIPROCATING FLUID MOTOR
Filed Dec. 30, 1966
4 Sheets-Sheet 1
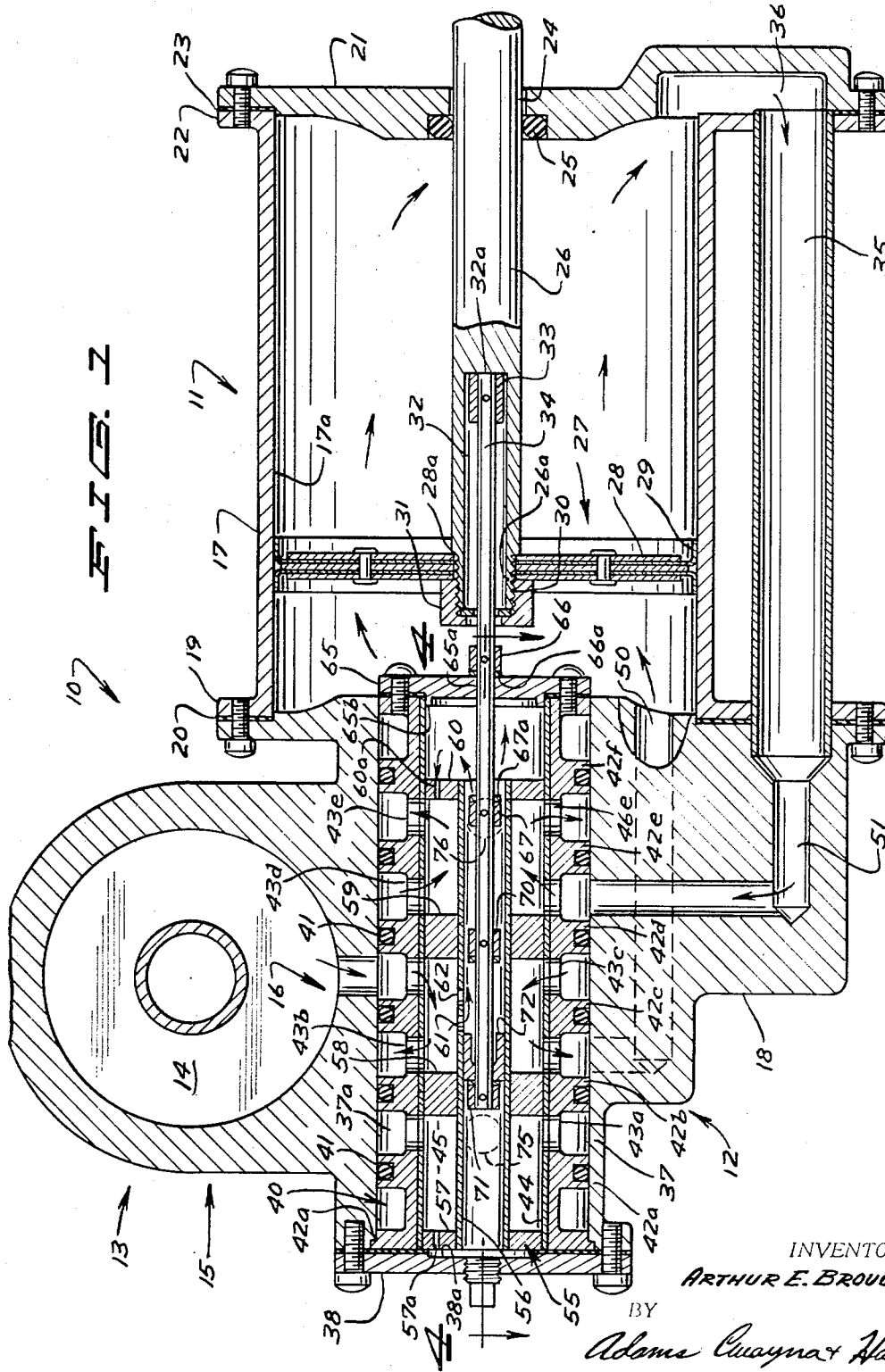
INVENTOR.
ARTHUR E. BROUGHTON
BY
Adams Cuayna & Haugen
ATTORNEYS

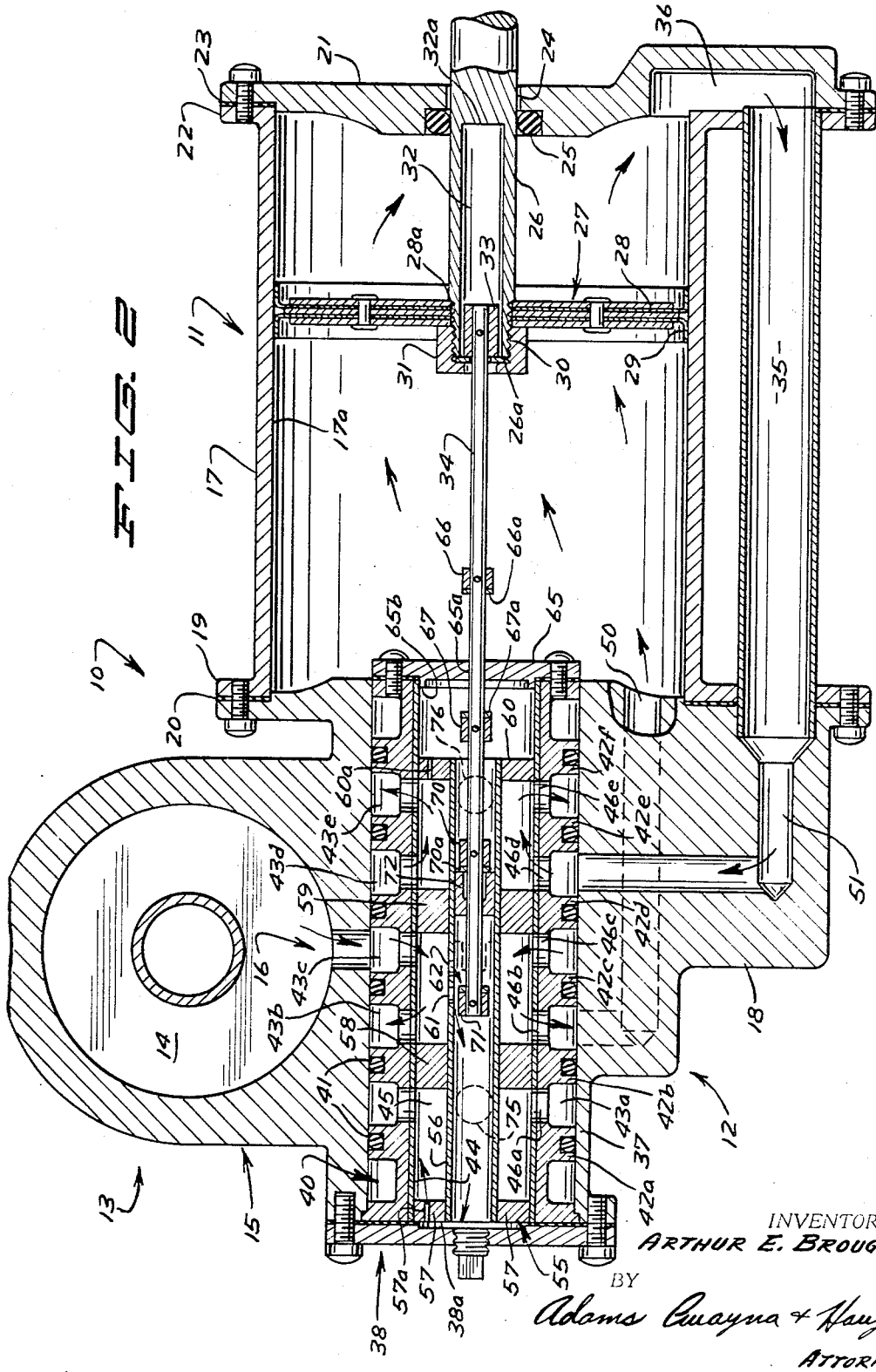

March 26, 1968     A. E. BROUGHTON     3,374,713
RECIPROCATING FLUID MOTOR
Filed Dec. 30, 1966     4 Sheets-Sheet 3
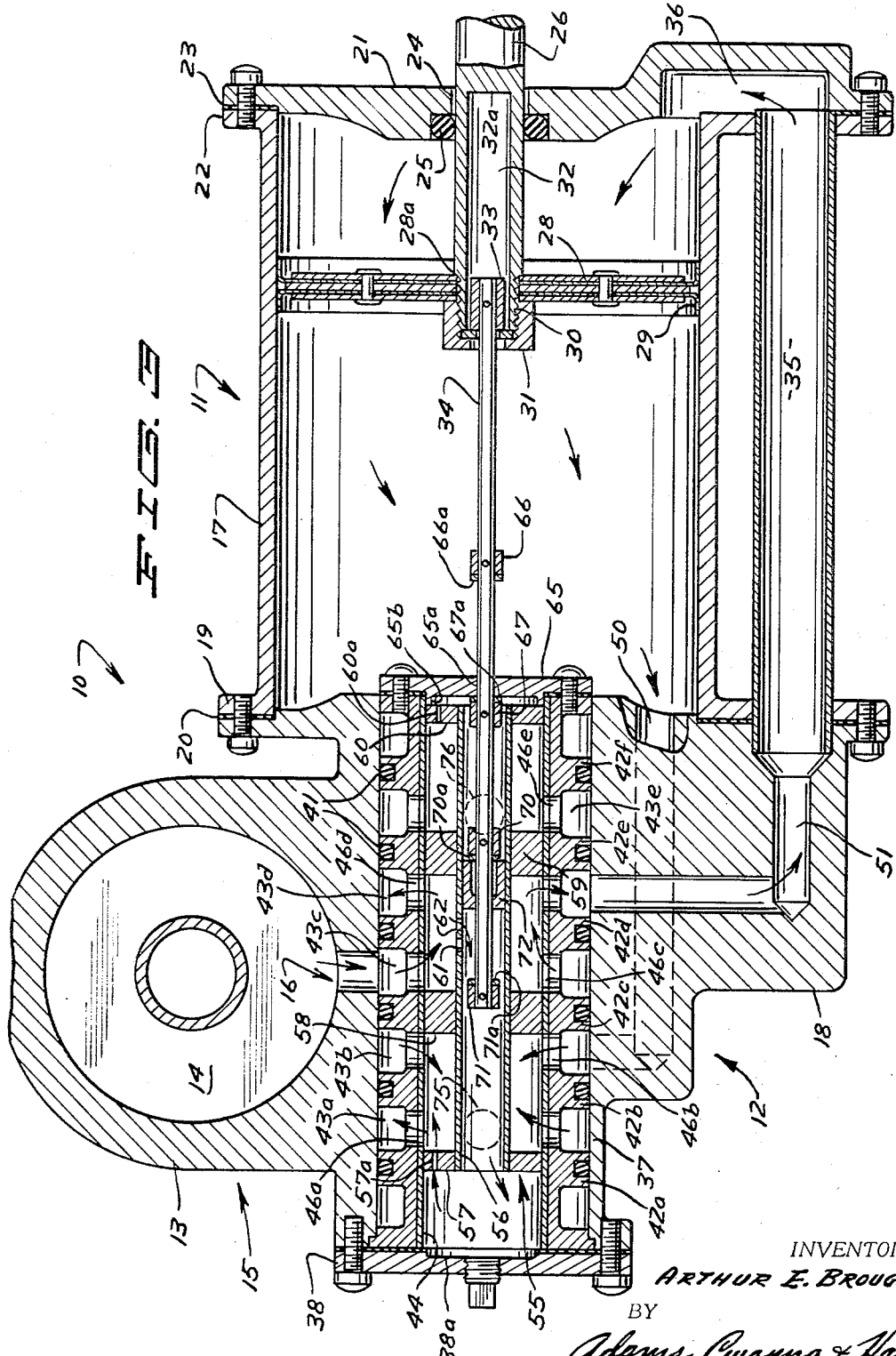
INVENTOR.
ARTHUR E. BROUGHTON
BY
Adams Cwayna & Haugen
ATTORNEYS

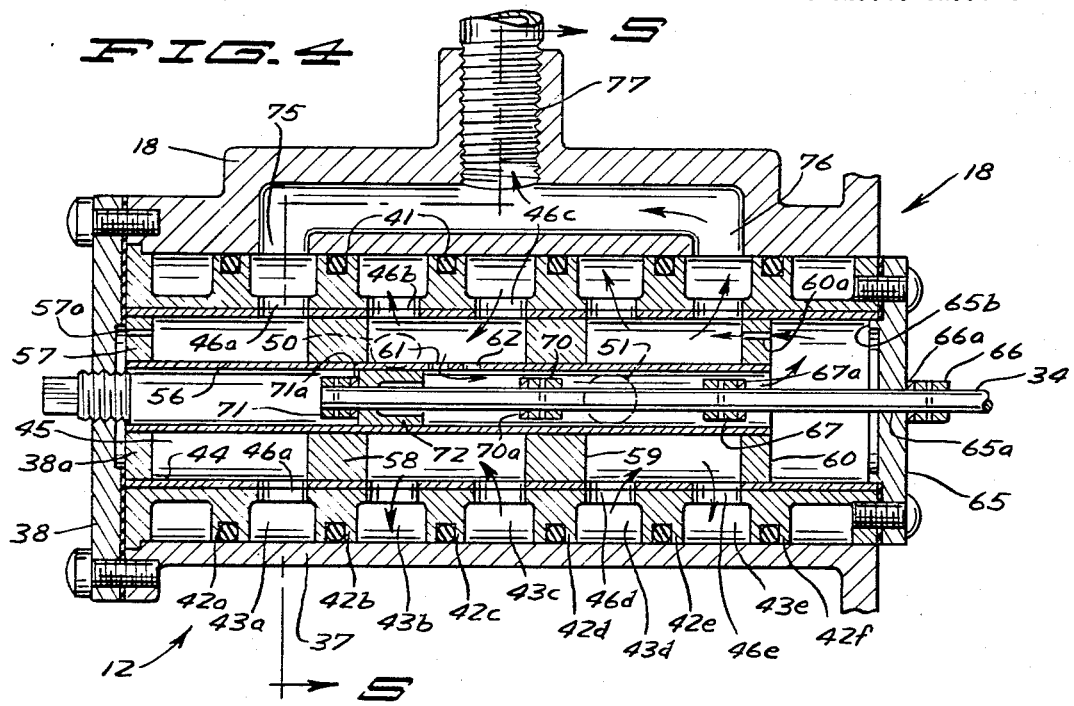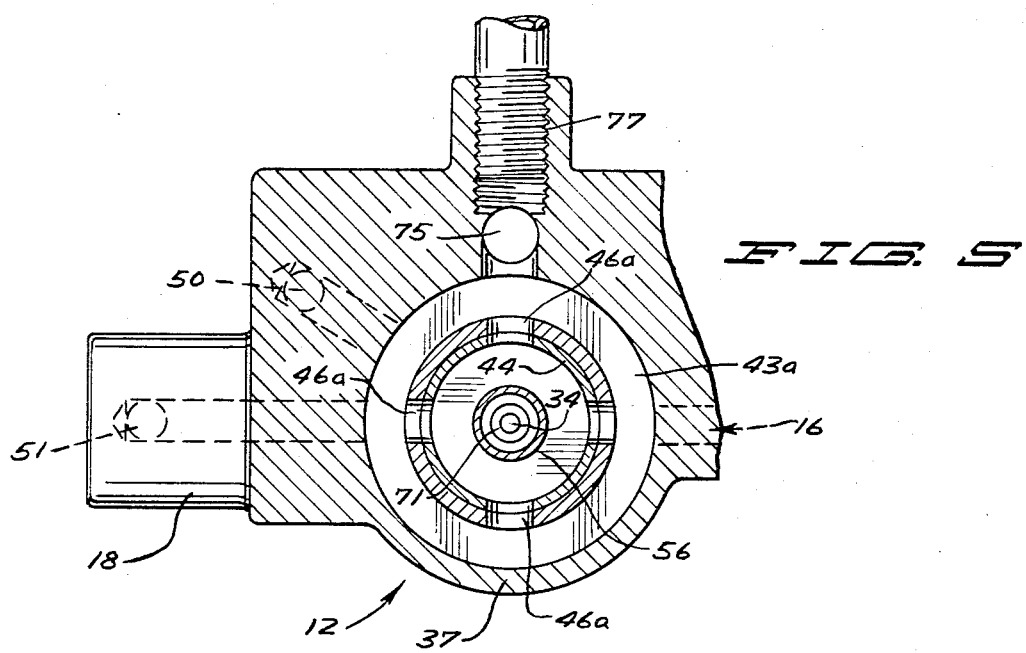

United States Patent Office 3,374,713
Patented Mar. 26, 1968

3,374,713
RECIPROCATING FLUID MOTOR
Arthur E. Broughton, Glens Falls, N.Y., assignor to Broughton Corporation, Glens Falls, N.Y., a corporation of New York
Filed Dec. 30, 1966, Ser. No. 606,406
6 Claims. (Cl. 91—312)

ABSTRACT OF THE DISCLOSURE

This invention relates particularly to the control portion for a reciprocating fluid motor and more particularly to a valving structure which includes a stationary spool valve with porting defined therethrough to enable the flow of fluid to either and from either side of an oscillating drive piston with a movable spool valve provided internally thereof to control the shifting of the flow of fluid to the respective sides of the oscillating drive piston and having a control member internally thereof which control member is mechanically linked to the drive piston for movement therewith but is not mechanically linked to the movable spool valve but rather is fluidly linked therewith for controlling of fluid to the respective sides of the removable piston for shifting thereof when the drive piston reaches the respective ends of its stroke. The shifting of the shiftable spool valve is accomplished by moving the control rod with the drive piston past a valving port which will cut off pressure to one end of the slidable spool valve and introduce pressure to the other end thereof such that shifting of the movable spool valve will be accomplished and will thereby, in turn, accomplish shifting of the porting in the stationary valve to direct fluid flow to the opposite side of the drive piston. The linkage of the control rod and the spool valve is accomplished only through fluid linkages thereby eliminating any mechanical connection therebetween other than that required for sealing.

---

In various fields such as the papermaking industry the presence of water with the possible danger accompanying the utilization of electrical power has brought forth a need for fluid operated motors which are capable of imparting reciprocating or oscillating motion to a variety of mechanical units. In the past various oscillators have been provided, one of which is the applicant's own prior invention protected by U.S. Patent No. 2,597,443. The principle behind this originally patented oscillator was to provide a fluid motor providing a reciprocating motion wheren the motion was cushioned or retarded at the end of each stroke such that the adverse hammering usually accompanying reciprocating motors at the end of each stroke was eliminated.

The unit is supplied herein encompasses many of the principles involved in this prior United States patent as well as many of the principles well know to those acquainted with the art of producing reciprocating fluid motor structures. A main object of this invention however is to provide a more simplified and trouble free construction for the control of the reciprocation of the drive member within the oscillator such that the mechanical linkages of the fluid flow control portions are eliminated. This new construction in essence provides a unit which is responsive to and controlled by hydraulic pressure and wherein the control portions thereof are shifted primarily through pressure and fluid linkages.

One of the major drawbacks in utilization of oscillators or reciprocators to this time has been the interworking of mechanical structures within the control portions of the oscillator to shift and control the movement of the reciprocating piston. By eliminating any mechanical linkages between elements in the control the unit becomes primarily pressure and fluid responsive which will prevent faulty operation usually caused by damage or other fouling of linkage systems.

It is therefore an object of applicant's invention to provide a fluid motor such as a reciprocator or the like wherein the control portion for controlling the direction for movement of a reciprocating piston provides a fluid linkage between control elements to eliminate mechanical linkages therebetween.

It is a further object of applicant's invention to provide a new and unique control system for fluid motors such as reciprocators and the like wherein the fluid control unit primarily includes a fluid directional control element to direct the entering fluid into proper portions thereof and into proper relation to the various moving parts within the control unit to shift the control portions thereof thereby eliminating any mechanical linkages between the movable control portions thereof.

It is a further object of applicant's invention to provide a new and unique control unit for a fluid motor such as a reciprocator or the like which is a complete self contained removable unit, insertable and replaceable into the device without requiring a complete teardown thereof.

It is a further object of applicant's invention to provide a control unit for a reciprocating fluid motor or the like wherein the control device is governed by directing entering fluid and whereby the pressure of the entering fluid acting upon the movable portions thereof serve to shift the control portions thereof to properly drive the movable driving piston and mechanical actuating end thereof.

These and other objects and advantages of my invention will more fully appear from the following description made in connection with the accompanying drawings, wherein like reference characters refer to the same or similar parts throughout the several views, and in which:

FIG. 1 is a longitudinal section through a fluid motor embodying the concepts of applicant's invention showing the elements in position to initiate motion of the drive piston to the right;

FIG. 2 is a view similar to FIG. 1 illustrating the elements in position as the piston reaches its furthermost right end of the stroke and illustrating the shifting of certain elements to reverse the flow of fluid to the piston and thus reverse the driving direction of the piston;

FIG. 3 is a view similar to FIG. 2 illustrating the elements in position subsequent to the shifting thereof to direct the movement of the drive piston to the left;

FIG. 4 is a longitudinal section taken substantially along line 4—4 of FIG. 1 displaced 90° from the view of FIG. 1 and principally illustrating the exhaust portions of the control element; and FIG. 5 is a transverse section taken substantially along line 5—5 of FIG. 4 illustrating the relation of porting portions of the control element.

In accordance with the accompanying drawings the fluid motor generally designated 10 embodying the concepts of applicant's invention includes a reciprocating power delivery section 11, a fluid control section 12 and a fluid inlet section 13. The basic concept in the action of the reciprocator is to provide inlet fluid into the control section 12 of the unit where it will be directed to either side of a double acting piston within the reciprocating power delivery section 12. While delivering fluid to one side of the piston within the reciprocator 11 the control section 12 will be receiving exhaust fluid from the other side of the double acting piston and exhausting the same. Upon the completion of a stroke in one direction the fluid control section 12 will be shifted into a second position whereby fluid will now be directed to the opposite side of the piston within reciprocator 11 and drive the same in the opposing direction. Likewise during this second position exhaust fluid from the now depressurized side of the piston will be directed into proper exhaust ports.

The function of the water inlet section 13 is to provide water which is in filtered condition such that unfiltered sediment containing water will not flow into the control portion of the oscillator which unpure water may foul the action of the various elements therein. This inlet section 13 may comprise any type of filter member arranged within the cylindrical housing 15 which could then discharge into a main fluid control inlet 16.

The reciprocating power delivery portion 11 in the form shown includes a substantially cylindrical sleeve member 17 extending longitudinally from a flow control and inlet water casing 18 and is securely attached thereto as with a radially extending flange construction 19. A gasket member 20 is provided between the flange connector portion 19 to securely seal the same against fluid leakage. Cylindrical sleeve members 17 terminate in a tail casing 21, again securely and sealingly fastened to the cylindrical sleeve 17 through a flange member 22 with a gasket 23 interposed therebetween. In the form shown a central shaft aperture 24 is provided axially of the tail casing 21 and a packing gland 25 or the like is provided to seal against a reciprocating rod member 26 axially received and axially movable therethrough.

A drive piston 27 is arranged for reciprocating movement with sleeve 17 and in the form shown consists of a radially extending plate member 28 having sealing means 29 on the exterior surface thereof to seal against the inner wall 17a of the cylindrical sleeve 17. Piston member 27 is securely attached to the drive rod 26 by providing a shoulder 28a on one side thereof and threads 30 with an engaging nut member 31 on the other side thereof to securely hold the piston 27 on one end 26a of the drive rod 26.

Arranged on and mithin the same end 26a of rod 26 is a substantially axially arranged longitudinally extending chamber 32 to house a lost motion linkage member 33 arranged on the end of a control rod member 34 which rod 34 controls the various positions of the control section 12 as the piston is moved along its stroke. It should be obvious that the motion of connecting link 33 and shaft 34 is a lost motion connection wherein motion is not provided unless engagement of member 33 is made with either the closed end 32a of chamber 32 or the interior of the capturing nut element 31 on the other end of the axial chamber 32.

Means to provide and receive fluid under either inlet or exhaust pressure are provided to communicate with the tail casing end 21 of the longitudinal cylinder 17 and in the form shown this means may be a simple conduit 35 extending from the control housing 18 to a passage 36 formed integrally with the tail casing member 31. This conduit 35 will introduce or receive fluid from the chamber 17 at the remote end thereof such that any fluid received or delivered thereto is always received or delivered unto the far side of the reciprocating piston member 27.

Control housing 12 includes a housing member generally designated 18 defining a control member housing chamber defined as a longitudinally extending cavity 37 therein which cavity 37 is in axially aligned relationship to the drive shaft 26 and control shaft 34 cooperating with the piston assembly 27 within the reciprocating unit 17. This chamber 37 is sealed at one end with a cover plate 38 which cover plate is designed to hold the various control elements securely within the casing or housing member 18.

The first of the control elements includes a main control and chamber defining member designated 40 which in the form shown consists of a longitudinally extending spool member having a plurality of lands and grooves arranged circumferentially thereon. These lands are sealed against the inner surface 37a of chamber 37 through the utilization of O-rings or the like generally designated 41 and this member 40 is arranged in positive position within chamber 37 by providing a shoulder 40a on one end thereof in abutting relationship to the cover plate 38 and a mating shoulder formed in the housing member 18. The various lands on control member 40 are designated respectively 42a–42b–42c–42d–42e–42f and the grooves of importance between them are respectively designated 43a–43b–43c–43d–43e. Communicating passages are provided through the inner side walls of the grooves 43a–43e and through an inner lining member designated generally 44 which liner extends longitudinally within the chamber 45 defined within by control member 40. These passages are respectively designated 46a–46b–46c–46d–46e and permit fluid to flow from the circumferential grooves 43a–43e into the interior 45 of the control member such that in this manner there is communication allowed between selected grooves only through the interior of the control member 40.

It should be noted at this time that these grooves 43a–43e perform individual functions in conjunction with the control member 40 and as such the two end grooves 43a and 43e communicate with the exhaust portion of the unit for receiving fluid from the side of piston 27 exhausting fluid to discharge the same from the unit. Grooves 43b and 43d respectively communicate respectively with internal passages designated 50 formed in housing 18 to deliver to and receive fluid from the near side of piston 27 and a second internal passage 51 arranged to communicate with the conduit 35 feeding fluid to and receiving fluid from the far side of piston 27. In the form shown the central groove 34c communicates with the inlet 16 and again this is a circumfential groove system which allows the original inlet water to flow into the interior of main control member 40.

Arranged in longitudinal sliding position within chamber 45 of control member 40 is a shiftable valve member generally designated 55. This shiftable valve member 55 consists of a longitudinally extending conduit 56 having a plurality of outstanding flanges thereon. These flanges are spaced respectively along the length of conduit 56 and as such are numbered respectively 57–58–59 and 60. The two end flanges 57, 60 are provided with longitudinally extending passages 57a, 60a therethrough for purposes to be explained hereinafter while the flanges 58–59 are spaced from the end flanges and from each other a predetermined distance such that in any of the positions to be discussed two of the communicating channels 46 and grooves 43 are arranged in communicating relation therebetween. These flanges 57 through 60 are provided for longitudinal sliding sealing movement within chamber 45 and do control the flow of fluid from the inlet system 16 into the reciprocating control portion 11.

It should be noted that a pair of radial passages 61–62 are arranged intermediate flanges 58–59 and communicate with the interior of the conduit 56 through the area defined by flanges 58–59. In the form shown two such apertures are provided but it should be obvious that a plurality of apertures could be arranged in circumferential relationship about conduit 56 to obtain communication between the inner and outer portions of this conduit.

The inner end of control member 40 is sealingly closed by a flange member 65 which is of the same radial dimension thereof such that the entire unit may be removed from the longitudinal chamber 37 by simply removing the closure plate 38 and pulling the entire unit longitudinally extending shoulder 65b, the purpose of which will be explained hereinafter and likewise flange 38 is provided with a reduced chamber portion 38a therein to be in aligned relation to longitudinal aperture 57a in flange 57 for purposes which will be explained hereinafter.

Control rod 34 extends from piston communicating relationship within chamber 32 of piston 27 inwardly through the closure flange 65 of the control member 12 into the interior of the slideable valve member 55. In the form shown a pair of first closure and sealing elements 66–67 are arranged on shaft member 34 in predetermined spaced relationship from the lost motion element 33 and it should be noted that each of these elements has an inward facing, resilient sealing surface 66a–67a thereon to seal against the rod aperture 65a formed through the sealing flange 65. It will be obvious as the operational aspects of this unit are discussed that the resilient sealing surfaces 66a–67a prevent the flow of fluid from the interior portions 45 of the control chamber into piston section 11.

Rod 34 continues axially within the chamber conduit 56 and a second pair of control stop elements 70–71 are arranged thereon, respectively spaced from and adjacent to the end of rod member 34. These members again are provided with resilient inwardly facing ends 70a–71a thereon for sealing against the flow of fluid through a directional flow control plug 72. Plug member 72 is arranged in sliding relation upon rod 34 intermediate the two stop members 70a–71a and it is this specific relationship of the slideable member 72 and the spaced stop members 70a–71a along with apertures 61–62 which actually control the shifting and movement of the control portion 55 of the unit 12 and likewise thereby control the flow of fluid either from or into the respective communicating passages 50–51 through the housing and onto the respective sides of the piston 27. It should be obvious then that the plug 72 is slidingly and sealingly arranged within the interior of conduit 56 and as illustrated in FIG. 1 is in proximity to the two apertures 61–62 through the circumference of conduit 56 such that the flow of fluid may be directed either to the right or left of such apertures depending upon the respective position of the closure plug 72.

As illustrated in FIG. 4 the exhaust portions of the control member 12 are offset 90° to the view shown in FIG. 1 and are arranged to communicate respectively with the aforementioned grooves 43a and 43e and the communicating passages 46e and 46a into the interior of member 40. A pair of pasages designated respectively 75–76 are provided through the housing member 18 and are designed to be in communicating relationship through the circumferential groove 43a defined respectively between the lands 42a–42b and grooves 43e defined between the lands 42e–42f and likewise extend to a common exhaust port 77.

Operation

The operation of the unit is to provide a driving force operating alternatively against the sides of the piston 27, such that a mechanical reciprocation is delivered to rod 26. To explain the operation of the unit the figures include an entire shifting sequence illustrated in FIGS. 1–3 and as illustrated in FIG. 1 the position of all the elements of the unit are shown at their extreme left side of the stroke and fluid is being delivered to drive the piston 27 to the right. To drive the piston 27 to the right, fluid enters from the strainer or inlet device 14 through inlet chamber or passage 16 into and about groove 43c. This fluid passes inwardly into the control area of member 40 by flowing through passage 46c between the interior 45 of control member 40 and groove 43c. Fluid flowing into this interior position is directed into two areas.

A first major portion of the fluid is delivered through passage 46b into circumferential groove 43b where it is free to flow into conduit 50 in the housing member 18. This fluid is then delivered into the area to the left of the driving piston 27 and acting thereon will force the piston 27 to the right.

A second portion of the fluid entering the control area of member 40 is directed into the two apertures 61–62 formed in conduit 56 of slideable valve member 55. The position of the closure plug 72 being to the left of said apertures 61–62 will permit water to flow only to the right within conduit 56 and into the area bounded by flange 60 and closure plate 65. A portion of this fluid is permitted to flow from this defined chamber through longitudinal passage 60a in flange 60 into the exhaust portion of the unit. This exhaust will enter along with other exhaust fluids as described hereinafter through passage 46e into groove area 43e where it will be discharged through passage 76 out of the common drain 77. It should be noted that the closure plug 72 permits flow of fluid through conduit 56 only to the right by sealing against the interior of the conduit 56 and likewise sealing against the resilient portion 71a of stop member 71.

In order to permit travel of piston 27 to the right, provision must be made to exhaust fluid contained in the area to the right of piston 27. This fluid is forced from this area into integral passage 36 formed in tail casing 21 through conduit 35 into the casing conduit or passage 51. As illustrated, passage 51 communicates with circumferential groove 43d and radial passage 46d such that exhaust fluid is directed into the interior of control member 40 between flanges 59–60 of the shiftable valve member 40. This is the same exhaust area into which fluid has been delivered through passage 60a and likewise the flow of this exhaust fluid is through passage 46b, circumferential groove 43e into the exhaust passage 76 and into common exhaust member 77. This flow of fluid continues until the piston nears the end of its directional stroke to the right and at this time the lost motion connection between lost motion element 33 and chamber 32 and more specifically the closure nut element 31 closing chamber 32 will draw the lost motion element 33 to the right and thereby draw the control rod 34 therealong.

In the position shown with fluid flowing to the right into the area defined by flange 60 and flange 65 pressure acting against the plug element 72 will hold the control rod and lost motion element 33 in its furtherest most left position. This position will also serve to seal the area defined by flange 60–65 due to the fact that a stop closure element 66 carried by rod 34 is sealed against the outer surface of flange 65 by contacting therewith the resilient sealing member 66a.

The plug element 72 is substantially of the same longitudinal dimension as the longitudinal dimension between the extremities of passages 61–62 such that a minimum time exists as the plug element 72 is drawn past the apertures 61–62 when no fluid flows to and through passages 61–62. At the very instant that the lost motion element 33 and rod 34 draw the plug element 72 past aperture 61 fluid will start to flow to the left of the control plug 72 and this fluid will automatically force the plug element 72 to the right along rod 34 where it will seal against stop element 70 and more specifically the resilient surface 70a of stop element 70. This specific process is illustrated in the comparison between the dotted and solid lines of the plug element 72 in FIG. 2. Fluid now entering the slideable valve conduit 56 to the left of plug member 72 will proceed to the end of said conduit 56 and force the water contained therein into the chamber 38a formed in enclosure plate 38. This pressure will exert a moving force against the slideable valve member 55 and will force the same immediately to the furthest most right end of the chamber 45 of control member 40. This right most position is illustrated in FIG. 3 where the slideable valve member 55 has completed its entire movement to the right.

It should be noted that passage through flange 60 is of limited size and will thus permit the effective pressure of the entering fluid to move the valve 55 to the right while providing a certain cushioning effect. This effect is obtained for the shifting of valve member 55 to the right as fluid has been entrapped into the conduit 56 and the area bounded by flange 60–65 through the shifting of plug member 72 past aperture 62. The fluid entrapped herein is free to and is driven from this defined chamber through passage 60a in flange 60 at a limited rate and as such provides a cushion of water against which valve 40 is driven. This system is proven to eliminate the hammering of the shifting of such valve elements. It should be noted that the shifting of plug element 72 and valve member 55 is in rapid sequence and the time lag is minimal to obtain the total shifting of valve 55 to the right.

Having moved valve 55 to the right a reverse flow of fluid is obtained to the piston 27. This particular flow of fluid is illustrated in FIG. 3 where the entering fluid through inlet passage 16 is now directed through groove 43c and passage 46c into the interior 45 of control valve 40 where it is again directed into two specific locations. A first major portion of this fluid is permitted to flow between the flanges 58–59 of slideable valve member 55 into the adjacent passage 46d and groove 43d where it is free to exit through housing passage 51 into the longitudinally extending conduit 35 and tail casing passage 36 to act upon the right side of piston 27 to drive the same to the left. Fluid is exhausted from the left side of piston 27 by entering the housing passage 50 for discharge into groove 43b and passage 46b where it now enters the area bounded by the liner 44, conduit 56 and flanges 57–58. Exhaust is obtained from this chamber through passage 46a, circumferential groove 43a and as illustrated in FIG. 4 into the communicating exhaust passage 75 into the common exhaust port 77.

In this position a second portion of the inlet fluid is directed again through apertures 61–62 into the chamber defined by plate 38 and flange 57. Drainage of fluid from this particular chamber is permitted through passage 57a through flange 57 where this fluid again joins the exit fluid for delivery through passage 46a, groove 43a and out of communicating exhaust passage 75 and into the common exhaust element 77. This fluid flowing into the conduit 56 again remains acting against the plug 72 which plug is sealed against the resilient surface 70a of stop member 70 and will of course exert a likewise force against the closure plug 67 sealing resilient surface 67a against plate 65.

As the piston 27 is driven to the left and reaches its leftmost end of its stroke the stop element or lost motion element 33 is driven by the end 32a of the lost motion chamber 32 to the left until the apertures 61–62 have been closed and then reopened when the same sequential shifting of plug 72 and slideable valve member 55 takes place shifting the entire control portion thereof to the left.

The system as illustrated herein eliminates any mechanical linkages between the control rod and lost motion member and the actual flow controlling member. All connections between these elements are of hydraulic nature and rely solely upon the pressure of the inlet fluid. The positioning of valve 55 of course is the principal determining factor in determining the direction of flow to piston 27 and the inlet fluid under pressure acts to positively not only shift this valve member 55 into proper position but also to hold the same in proper position after the same has been shifted.

It should be obvious that the hydraulic linkage employed herein eliminates mechanical linkage between the control rod and the valve member and thereby eliminates many mechanical problems ordinarily found when acting with forces which are sometimes required in these reciprocators and as no mechanical linkages are present there is no chance of any mechanical fouling or tying up of the various elements. Likewise the possibility of linkages breaking is eliminated.

It should be obvious that applicant has provided a new and unique control system for a reciprocating fluid motor or the like wherein the control elements are shifted and positively held in shifted position through a hydraulically controlled linkage system and wherein the number of moving parts necessary to positively maintain proper actuation of the unit is limited by the hydraulic replacement for the mechanical linkage.

It will, of course, be understood that various changes may be made in the form, details, arrangements and proportions of parts without departing from the scope of my invention, which generally stated consists in the matter set forth in the appended claims.

What is claimed is:
1. A recprocating fluid motor including:
 (a) a cylinder;
 (b) a double acting piston working within said cylinder;
 (c) a control housing for supplying and exhausting fluid to and from said cylinder at the two sides of said piston;
 (d) means for supplying fluid under pressure to said housing;
 (e) a shiftable valve member in said housing controlling the supply and exhaust of fluid to supply fluid to one side of said piston and exhaust fluid from the other side of said piston when said valve is shifted to a first position and to supply fluid to the other side of said piston and exhaust fluid from said one side of said piston when said valve is shifted to a second position;
 (f) said shiftable valve member including an axially extending passage therethrough with passage means for directing a portion of said supply fluid therein;
 (g) means for controlling the position of said valve member including:
  (1) a control rod associated with said piston to be actuated thereby as said piston approaches the end of its stroke respectively in each direction and having a pair of spaced stop elements on the other end thereof within said axially extending passage;
  (2) a control member slideably arranged on said control rod between said stop elements and being slideably sealing arranged within said axially extending passage to direct fluid received therein alternately to a first portion of said housing to shift said shiftable valve from first to second position and supplying fluid to a second portion of said housing to shift said shiftable valve from second to first position in response to the position of said piston;
  (3) said control member being moved and positioned by said stop elements through at least a portion of said rod movement and moved and positioned through at least the remainder of distance between said stops by the flow of fluid into said axial passage after said control member has passed a portion of said passage means to provide a relatively rapid opening to the remainder of said passage means.

2. The structure set forth in claim 1 and means carried by said shiftable valve member to exhaust fluid from said second housing portion when said valve member is shifted from first to second position and to exhaust fluid from said first housing portion when said valve member is shifted from second to first position.

3. The structure set forth in claim 2 wherein the exhaust fluid from said housing portions is directed respectively into the exhaust from the sides of said piston.

4. The structure set forth in claim 1 wherein
 (a) said control housing includes:
  (1) an inlet to receive fluid;
  (2) an exhaust outlet;
  (3) a pair of conduits controlling and directing the flow of fluid from and to respective sides of said piston;
 (b) said shiftable valve member arranged and constructed to allow communication from said inlet to one of said conduits and from the other of said conduits to said exhaust in said first position, and allowing communication from said inlet to said other of said conduits and from said one of said conduits to said exhaust in said second position.

5. The structure set forth in claim 1 and said control rod extending into said housing and having a pair of spaced sealing members thereon to seal against said housing when said rod is in its respective positions.

6. The structure set forth in claim 1 wherein said passage means supply fluid to said axially extending passage of said shiftable valve member includes at least a pair of longitudinally spaced inlet passages and the longitudinal length of said control member is defined to cover only the longitudinal extremities of said pair of passages.

References Cited

UNITED STATES PATENTS

| | | | |
|---|---|---|---|
| 923,486 | 6/1909 | Bowen | 91—313 |
| 927,560 | 7/1909 | Lewis | 91—313 |
| 1,276,721 | 8/1918 | Cartwright | 91—313 |
| 2,361,757 | 10/1944 | Fink | 91—313 |

CARLTON R. CROYLE, *Primary Examiner.*

PAUL E. MASLOUSKY, *Examiner.*